US011350557B2

(12) United States Patent
Angleitner

(10) Patent No.: US 11,350,557 B2
(45) Date of Patent: Jun. 7, 2022

(54) AGRICULTURAL WORKING TOOLS

(71) Applicant: AGCO Feucht GmbH, Feucht-Bayern (DE)

(72) Inventor: Klaus Angleitner, Langensendelbach-Brauningshof (DE)

(73) Assignee: AGCO FEUCHT GmbH, Feucht (DE)

( * ) Notice: Subject to any disclaimer, the term of this patent is extended or adjusted under 35 U.S.C. 154(b) by 14 days.

(21) Appl. No.: 16/269,352

(22) Filed: Feb. 6, 2019

(65) Prior Publication Data

US 2019/0254221 A1 Aug. 22, 2019

(30) Foreign Application Priority Data

Feb. 16, 2018 (GB) ..................................... 1802548

(51) Int. Cl.
*A01B 59/041* (2006.01)
*A01B 59/00* (2006.01)
*A01B 63/14* (2006.01)
*A01D 78/10* (2006.01)
*A01D 78/00* (2006.01)

(52) U.S. Cl.
CPC .......... *A01B 59/041* (2013.01); *A01B 59/002* (2013.01); *A01B 63/14* (2013.01); *A01D 78/1014* (2013.01); *A01D 78/005* (2013.01)

(58) Field of Classification Search
CPC ..... A01B 59/041; A01B 59/002; A01B 63/14; A01B 78/005; A01D 78/005; A01D 78/1014
USPC ........................................................ 172/450
See application file for complete search history.

(56) References Cited

U.S. PATENT DOCUMENTS 2,569,389 A * 9/1951 Seaholm ................ A01B 63/10
 172/307
6,082,211 A * 7/2000 Yamakaji ............. A01B 59/041
 172/47
8,469,386 B2 * 6/2013 Clark et al. .......... A01B 59/042
 172/248

FOREIGN PATENT DOCUMENTS

| DE | 3619045 A1 | 12/1987 |
| DE | 3937172 A1 | 5/1990 |
| EP | 0 461 386 A1 | 12/1991 |
| GB | 2 232 055 A | 12/1990 |

OTHER PUBLICATIONS

UK Intellectual Property Office, Search Report for related UK Application No. GB1804528.6, dated Aug. 17, 2018.
European Patent Office, Search Report for related EP Application No. 19 15 1986 , dated Jun. 18, 2019.

* cited by examiner

*Primary Examiner* — Thomas B Will
*Assistant Examiner* — Joel F. Mitchell

(57) ABSTRACT

A towed agricultural working tool with a central frame element, a headstock and left and right hand side frame elements connected to the central frame element, each of the side elements supporting at least one processing unit, the central frame element being connected at, at least one connecting location for pivoting movement with respect to the headstock in which one or more friction elements are arranged between the central frame element and the headstock at one of the at least one connecting locations. This has as an advantage that the pivoting movement of the central frame with respect to the headstock, in particular due to induced yaw, is reduced.

9 Claims, 5 Drawing Sheets

AGRICULTURAL WORKING TOOLS

BACKGROUND

Field of the Invention

The present invention relates to agricultural working tools for attachment to agricultural vehicles such as tractors, such agricultural working tools having a plurality of working units mounted to left and right hand side support frame elements, the left and right hand side support frame elements being foldable about a central support frame element between an operating configuration and a transport configuration.

Description of Related Art

The working units are typically driven processing members such as rakes or tedders. It is desirable to provide machines of greater working width to enable more efficient agricultural operation on a tract of land. This leads to an increased number of processing members being arranged on each side support element. It will be understood that each side support element is mounted at an inboard end to the central support element. Each of the side support elements conveniently take the form of an elongate framework to which the processing elements are mounted. As the side support elements get longer and more processing members are added, it will be understood that under the influence both of the weight of the processing members and the rotating motion of the processing members there is a tendency for the side elements to induce a yaw moment about the central support element and in particular about the connection of the towed agricultural working tool to the agricultural vehicle. Such a motion is also induced as the tools are moved about in the working position. This undesired motion will move the processing members away from an optimum operating position. It can also be a problem that the swaying motion of one side element is passed to the other side element increasing the problem.

However, it also the case that this problem must be set against the need for measures for improving the dynamic behaviour of towed agricultural working tools during driving of the tractor over the field with the side support frame elements in the operating condition, where it is desired for the towed implement to pivot in relation to the tractor when a turn is made.

It is known to provide springs at the articulation point between central support frame element and a headstock by which the agricultural working tool is secured to the agricultural vehicle to suppress these movements. However, this becomes more and more difficult with increasing working widths and because of the higher forces arising.

SUMMARY OF THE INVENTION

According to first aspect of the invention, a towed agricultural working tool is provided comprising a central frame element, a headstock and left and right hand side frame elements connected to the central frame element, each of the side elements supporting at least one processing unit, the central frame element being connected at, at least one connecting location for pivoting movement with respect to the headstock characterised in that one or more friction elements are arranged between the central frame element and the headstock at one of the at least one connecting locations. This has as an advantage that the pivoting movement of the central frame with respect to the headstock, in particular due to induced yaw, is reduced.

Preferably, the headstock comprises a plurality of elements, the central frame element comprises a plurality of elements located between the headstock elements and at least one friction elements is arranged between at least one of the plurality of central frame elements and one of the plurality of headstock elements.

More preferably the headstock elements, the central frame elements and the friction elements are compressed together. More preferably, the headstock elements, the central frame elements and the friction elements are clamped together.

Alternatively, the headstock elements, the central frame elements and the friction elements are mounted about a bushing. More preferably a fastener secures in compression the headstock elements, the central frame elements and the friction elements about the bushing.

Preferably, the friction elements comprise friction discs. Preferably each of the friction discs comprise one of the following: a mix of fiberglass and other materials moulded or woven into the friction disc, woven synthetic fibres, moulded synthetic materials, a mix of silicon dioxide and various metals and additives, sintered or brazed onto the friction disc, or a metal plate coated with a friction material.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal axis of the towed agricultural working tool which is parallel to a normal forward direction of travel.

Figure 1:
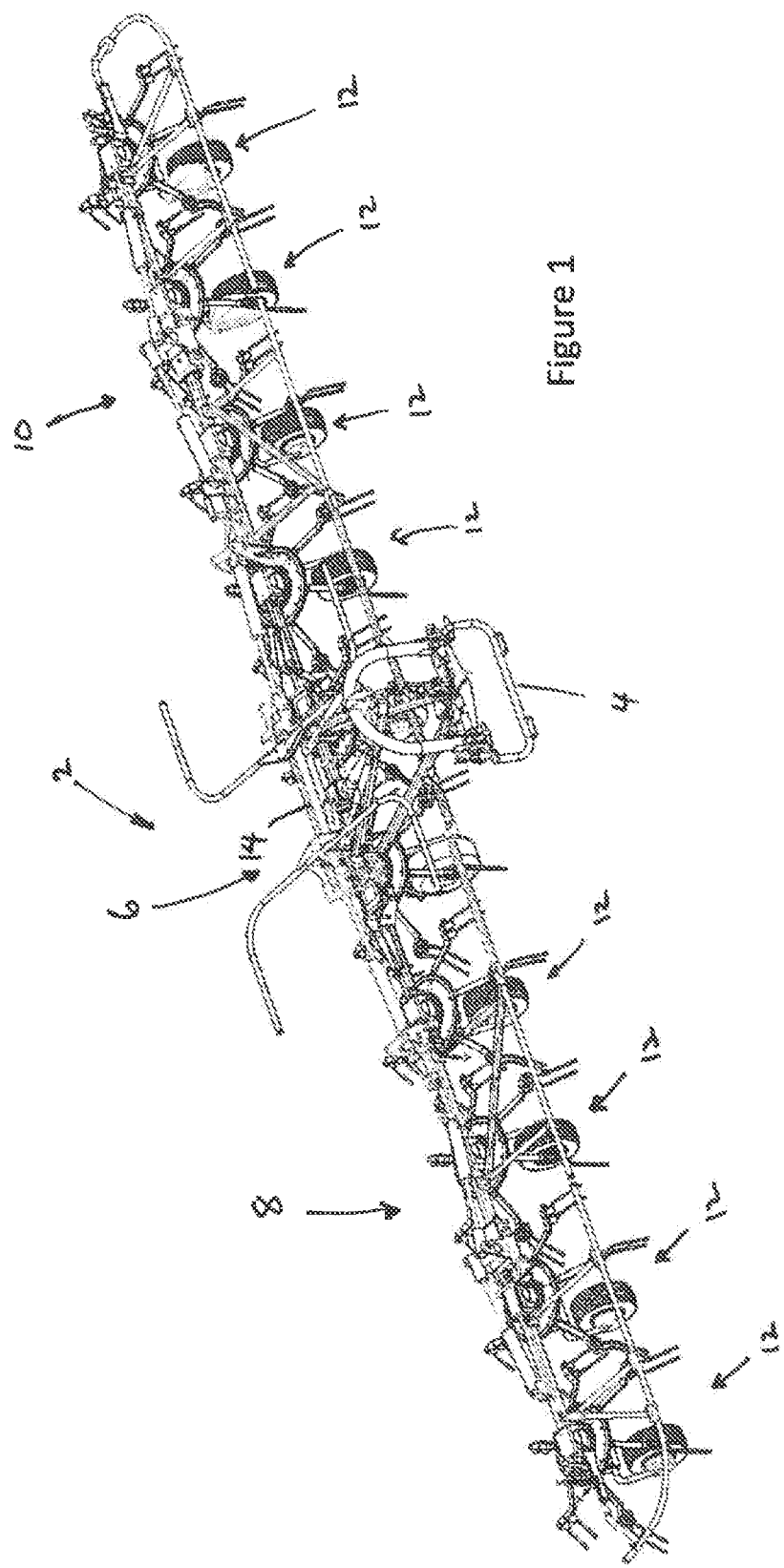
FIG. 1 shows a perspective view of a towed agricultural working tool in accordance with the invention.
Figure 2:
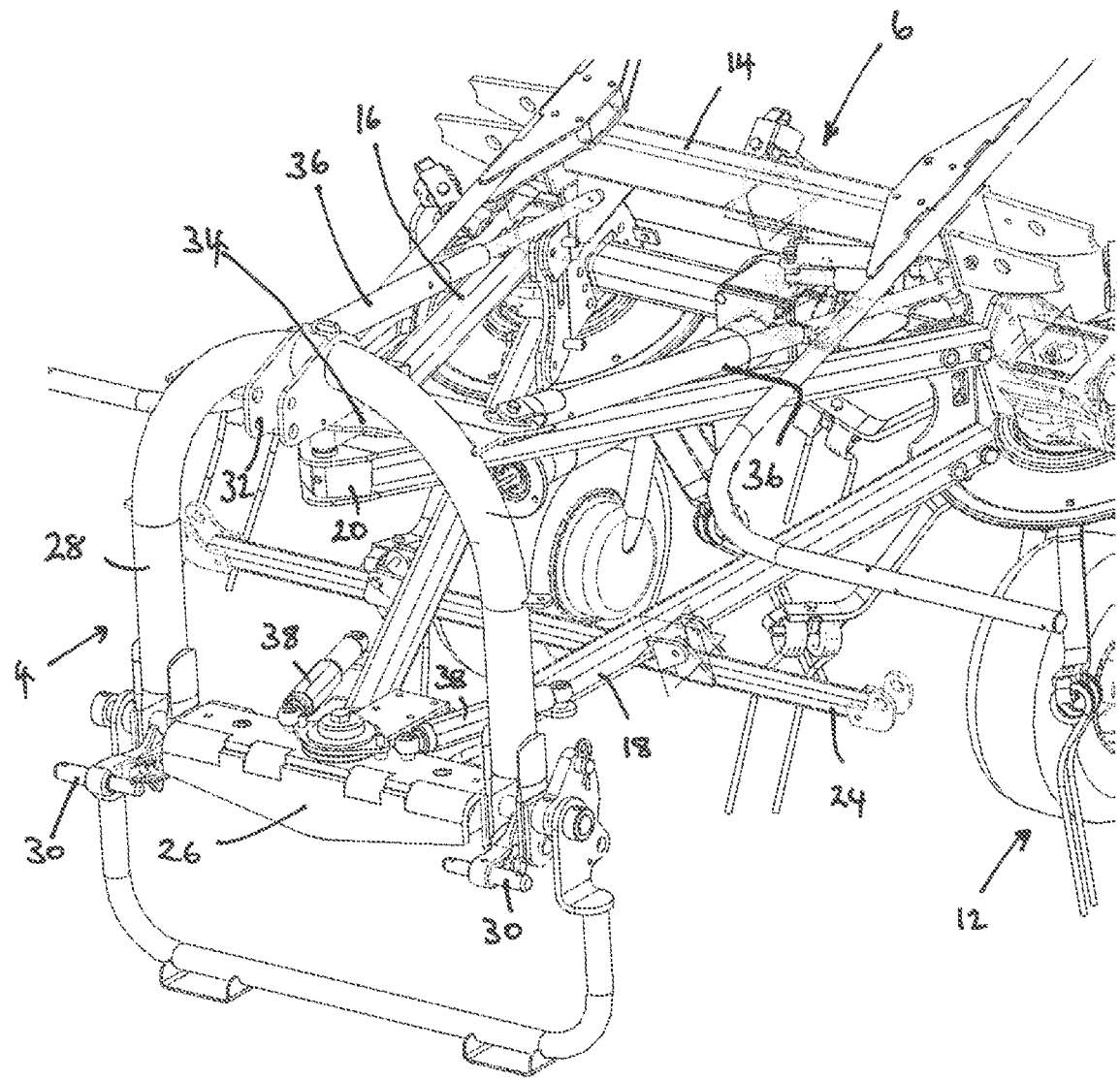
FIG. 2 shows a perspective view of a connection between the hitch and the agricultural working tool
Figure 3:
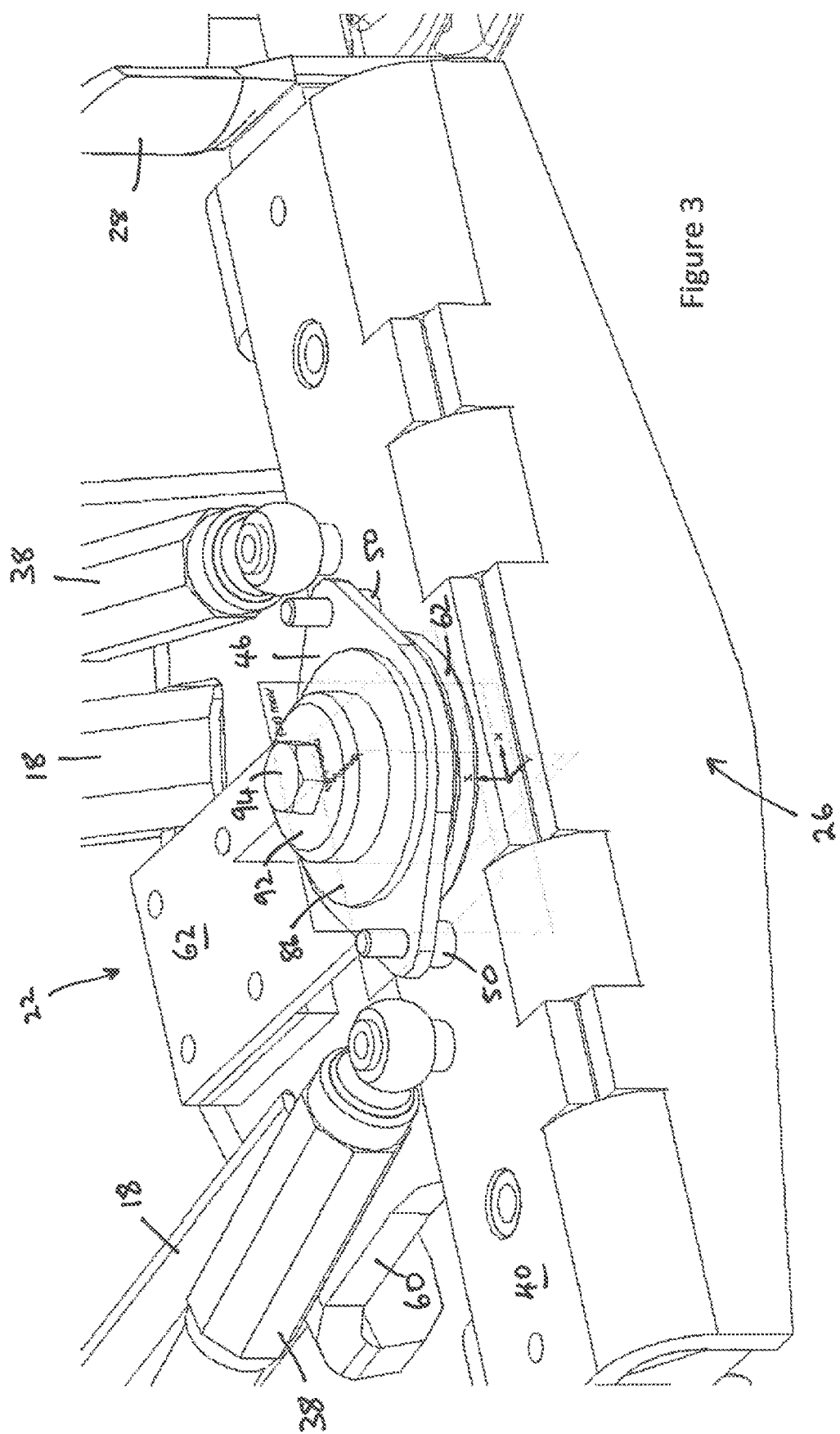
FIG. 3 shows a more detailed perspective view of the connection.

With reference to FIG. 1, an agricultural working tool 2 in the form of a ten rotor tedder is shown. The agricultural working tool 2 is provided with a headstock 4 for towing of the agricultural working tool 2 by an agricultural vehicle such as tractor, by mounting the headstock 4 to a three point hitch provided on the agricultural vehicle. For clarity neither the agricultural vehicle nor the three point hitch are shown in the Figures.

The agricultural working tool 2 further comprises a central frame element 6 and left and right hand side frame elements 8,10 connected to the central frame element 6, each of the side elements 8,10 supporting at least one processing unit 12, in FIG. 1 four such processing units 12 in the form of tedders are provided on each of the side frame elements 8.10. It will be understood that the side frame elements 8,10 are, in use, foldable about the central frame element 6 between an operating configuration and a transport configuration.

The central frame element 6 is generally triangular in plan view, with a base of the triangle to the rear. A further processing member 12 is located at each end of the base of the triangle.

The base comprises a rigid framework 14 from which an upper triangular frame 16 and a lower triangular frame 18 extend. An apex 20,22 of each triangular frame 16,18 is pivotally connected to the headstock 4. A front element 24 is connected across the lower triangular frame 18. Conveniently a front part of each of the side frame elements 8,10 is connected to this front element 24. A rear of each of the side elements 8,10 is connected to the lateral ends of the rigid framework 14.

The headstock 4 compress a horizontal element 26, the ends of which are secured to lower ends of an upwardly extending arch shaped element 28. Each of the lower ends of the arch shaped element 28 are provided with connecting elements 30 for connecting to the lower links of a three point hitch of an agricultural vehicle. A central upper part of the arch shaped element 28 is provided with a further connection element 32 for connecting to the upper link of a three point hitch of an agricultural vehicle.

The upper part of the arch shaped element 28 is also provided with an upper bracket 34 extending across the arch shaped element 28. The apex 20 of the upper triangular frame 16 is connected to the upper bracket 34 so as to provide a first pivoting connection to the headstock 4.

Additionally, upper holding elements 36, conveniently in the form of telescopic rods, are connected between the end of the upper bracket 34 and the ends of the rigid framework 14 of the central frame element 6.

The horizontal element 26 of the headstock 4 is also provided with a pivoting connection, whereby the apex 22 of the lower triangular frame 18 is connected to the headstock 4 for pivoting connection in relation to the headstock 4. Lower holding elements 38, conveniently in the form of telescopic rods, are connected between side elements of the lower triangular frame 18 and the horizontal element 26 of the headstock 4, the lower holding element connections being to either side of the pivoting connection of the apex 22.

Figure 4:
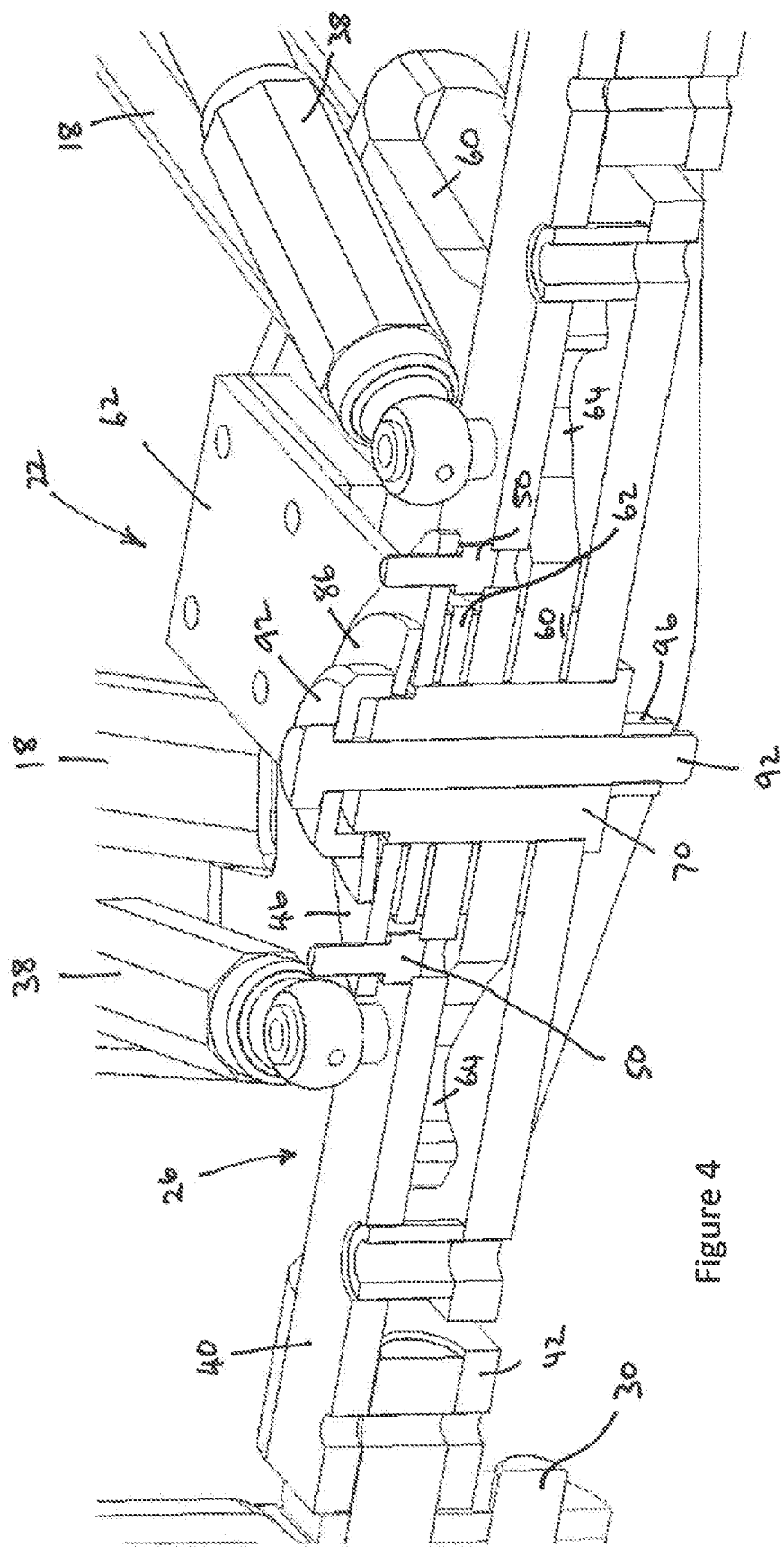
FIG. 4 shows a sectional view through the elements of FIG. 3.
Figure 5:
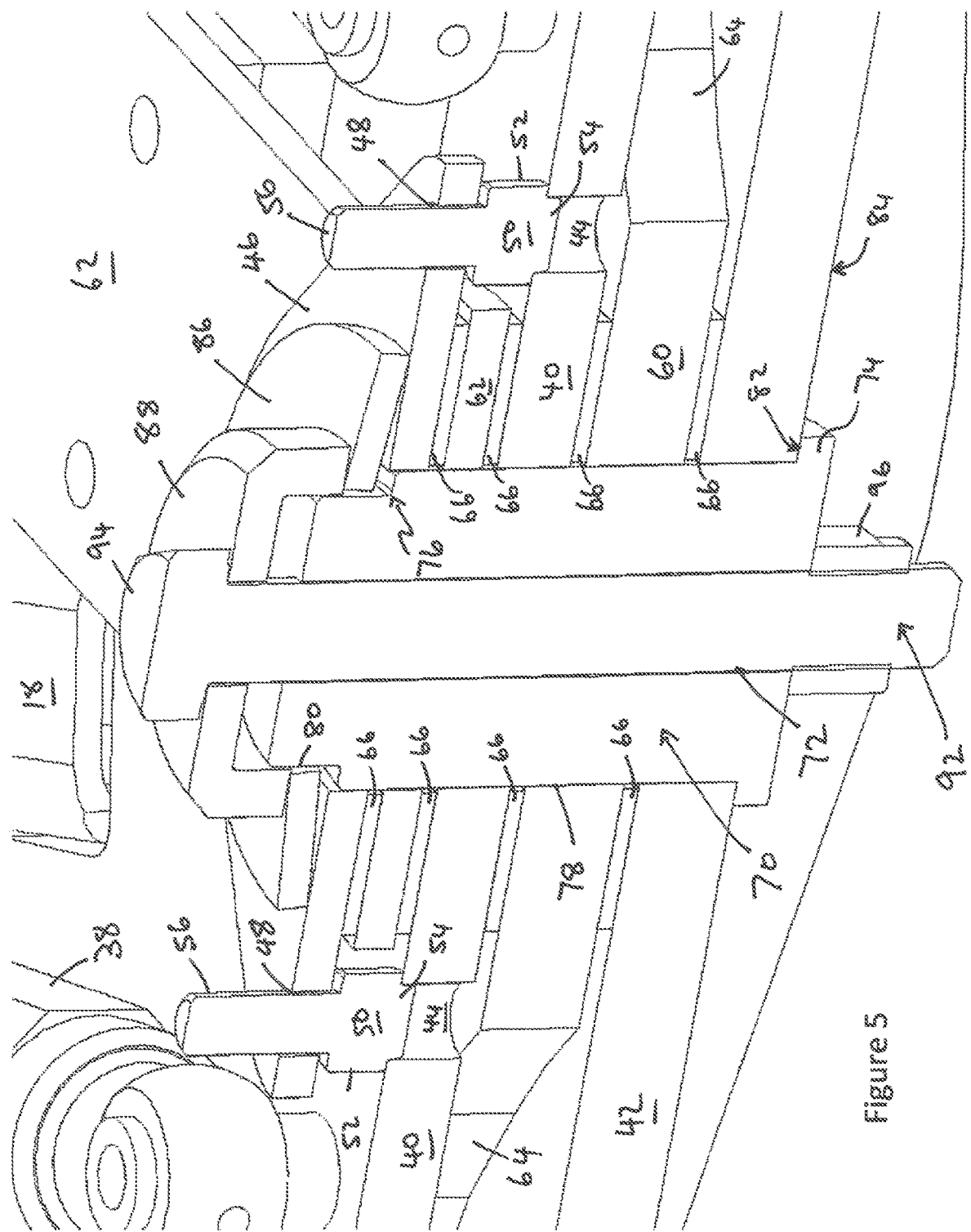
FIG. 5 shows a detail of FIG. 4.

The pivoting connection between the apex 22 of the lower triangular frame 18 and the horizontal element 26 of the headstock 4 is shown in more detail in FIGS. 4 and 5.

The horizontal element 26 of the headstock 4 comprises upper and lower elements 40,42 held, in any suitable manner, in fixed relationship to one another. The upper element 40 is provided with a number of spaced location openings 44, in the illustrated embodiment two such openings are shown. An end cap 46 is provided with a number of corresponding openings 48, in the illustrated embodiment two corresponding openings. Pins 50 are provided having a central wider portion 52. A first end 54 of each pin 50 is located in the spaced location openings 44 of the upper element 40 and a second end 56 extends through a corresponding opening 48 in the end cap 46. The central wider portion 52 of each pin 50 provides a minimum distance between the upper element 40 and the end cap 46. The end cap 46 is in this way held in a fixed relationship with respect to the upper element 40 of the horizontal element 26 of the headstock 4.

The apex 22 of the lower triangular frame 18 comprises a lower element 60 extending between the upper and lower elements 40,42 of the horizontal element 26 of the headstock 4 and an upper element 62 extending between the upper element 42 of the horizontal element 26 of the headstock 4 and the end cap 46. The lower element 60 and the upper element 62 of the apex 22 of the lower triangular frame 18 are held, in any suitable manner, in fixed relationship to one another. In the illustrated embodiment this is achieve though the use of a spacing plate. The lower element 60 of the lower triangular frame 18 is conveniently provided with cut away portions 64 to prevent possible interference of the lower element 60 with the connections made by the ends of the lower holding elements 38 secured to the headstock 4.

Friction elements 66 are layered between the headstock elements (including the end cap) 40,42,46 and the lower triangular frame elements 60,62.

The friction elements 66 may be formed in any suitable manner and are conveniently in the form of annular discs. For example, the friction elements 66 may be formed as a mix of fiberglass and other materials (including brass in some cases) moulded or woven into a disc, a disc of woven synthetic fibres, a disc of moulded synthetic materials, a disc of a mix of silicon dioxide and various metals and additives, sintered or brazed onto a friction disc, or a metal plate coated with a friction material.

Each of the friction elements 66, the headstock elements 40,42,46 and the lower triangular frame elements 60,62 are provided with an opening, preferably a circular opening.

A bushing 70 having a central through bore 72 is provided at a lower end with a radial flange 74 and at an upper end with a shoulder 76 between a main shank portion 78 of a first diameter and an end shank portion 80 of reduced diameter. In use, the bushing 70 is inserted into and through the lower headstock element 42 and the interleaved friction elements 66, lower triangular frame elements 6,62 and the other headstock elements 40,46 such that an upper surface 82 of the radial flange 74 abuts a lower surface 84 of the lower horizontal headstock element 42.

A spring washer 86 and a washer nut 88 are located about the reduced diameter end shank portion 80 of the bushing 70. The washer nut 88 has a recessed portion for seating about the end shank portion 80 of the bushing 70. A peripheral portion of the washer nut 88 abuts the spring washer 86. An upper part of the washer nut 88 is also provided with a through opening 90 corresponding in diameter to the central through bore 72 of the bushing 70.

A headed bolt 92 is passed though the washer nut 88 and the bushing 70 such that a head 94 of the bolt 92 is seated against an upper surface of the washer nut 88. The bolt 92 is provided with a thread extending from a free end along at least part of a shank of the bolt 92. A nut 96 is then threaded onto the free end of the bolt 92 and tightened such that an upper surface of the nut 96 is tightened against a lower surface of the bushing 70 causing the spring washer 86 to clamp the interleaved friction elements 66, lower triangular frame elements 60,62 and the headstock elements 40,42,46 together.

It may be seen that the bushing 70 serves as a pivot pin between the lower triangular frame 18 and the headstock 4.

In practice when an induced yaw moment occurs the friction elements 66 will act to prevent, or at least further dampen, movement between the central frame element 6 and the headstock 4.

It is an advantage that the relatively large friction surface between the friction discs 66 and each of the adjacent headstock and central frame elements that it allows for better absorption of the forces and so better absorbs the induced yaw. It may also be seen that the use of the friction discs 66 provides a compact solution compared to the use of springs. Further, the use of more or fewer friction discs 66, or friction discs 66 having different braking properties, allows modification in view of the desired braking to be applied to overcome the induced yaw.

From reading the present disclosure, other modifications will be apparent to persons skilled in the art. Such modifications may involve other features which are already known in the field and component parts therefore and which may be used instead of or in addition to features already described herein.

The invention claimed is:

1. A towed agricultural working tool comprising:
 a central frame element, and left and right hand side frame elements connected to the central frame element, each of the left and right side frame elements supporting at least one processing unit configured to work a cut crop material;
 a headstock for connecting the towed agricultural working tool to a hitch, the central frame element being connected at a connecting location for pivoting movement with respect to the headstock;
 at least one friction element arranged between the central frame element and the headstock at the connecting location wherein:
  the headstock comprises a plurality of headstock elements, wherein the plurality of headstock elements comprises at least an upper headstock element and a lower headstock element;
  the central frame element comprises a plurality of central frame elements that overlap the headstock elements, wherein the plurality of central frame elements that overlap the plurality of headstock elements comprises at least an upper frame element and a lower frame element; and
  the at least one friction element comprises a first friction element interleaved between the upper headstock element and the upper frame element and a second friction element interleaved between the lower headstock element and the lower frame element such that friction caused by the first friction element and the second friction element acts to dampen movement between the at least one of the plurality of central frame elements and the one of the plurality of headstock elements.

2. The towed agricultural working tool according to claim 1, wherein the headstock elements, the central frame elements and the friction elements are compressed together.

3. The towed agricultural working tool according to claim 1, wherein the headstock elements, the central frame elements and the friction elements are clamped together.

4. The towed agricultural working tool according to claim 1, wherein the headstock elements, the central frame elements and the friction elements are mounted about a bushing.

5. The towed agricultural working tool according to claim 4, wherein a fastener secures in compression the headstock elements, the central frame elements and the friction elements about the bushing.

6. The towed agricultural working tool according to claim 1, wherein the friction elements comprise friction discs.

7. The towed agricultural working tool according to claim 6, wherein each of the friction discs comprise one of the following:
 a mix of fiberglass and other materials moulded or woven into a friction disc; woven synthetic fibres;
 moulded synthetic materials;
 a mix of silicon dioxide and various metals and additives, sintered or brazed onto a friction disc; and
 a metal plate coated with a friction material.

8. The towed agricultural working tool according to claim 1, wherein the at least one processing unit is a rake or a tedder.

9. The towed agricultural working tool according to claim 1, wherein the at least one friction element also comprises a third friction element interleaved between one of the plurality of headstock elements and one of the central frame elements.

* * * * *